(12) United States Patent
Frank et al.

(10) Patent No.: US 8,036,247 B2
(45) Date of Patent: Oct. 11, 2011

(54) SYSTEM AND METHOD OF SYNCHRONIZING REAL TIME CLOCK VALUES IN ARBITRARY DISTRIBUTED SYSTEMS

(76) Inventors: Paul R. Frank, Eau Claire, WI (US); Gregory M. Thorson, Altoona, WI (US); Russell L. Nicol, Eau Claire, WI (US); Donglai Dai, Eau Claire, WI (US); Joseph M. Placek, Chippewa Falls, WI (US)

( * ) Notice: Subject to any disclaimer, the term of this patent is extended or adjusted under 35 U.S.C. 154(b) by 275 days.

(21) Appl. No.: 11/620,215

(22) Filed: Jan. 5, 2007

(65) Prior Publication Data

US 2008/0168182 A1    Jul. 10, 2008

(51) Int. Cl.
*H04J 3/06* (2006.01)
(52) U.S. Cl. ........................................................ 370/503
(58) Field of Classification Search ............... 709/248; 370/203, 351–385, 389–394, 395.1, 395.4, 370/395.42, 395.62, 400–411, 412–429, 370/503–528
See application file for complete search history.

(56) References Cited

U.S. PATENT DOCUMENTS

| | | | | |
|---|---|---|---|---|
| 4,142,069 | A * | 2/1979 | Stover | 370/507 |
| 4,530,091 | A * | 7/1985 | Crockett | 370/229 |
| 4,939,752 | A * | 7/1990 | Literati et al. | 370/238 |
| 5,822,381 | A * | 10/1998 | Parry et al. | 375/356 |
| 5,870,441 | A * | 2/1999 | Cotton et al. | 375/354 |
| 5,875,179 | A * | 2/1999 | Tikalsky | 370/315 |
| 6,631,483 | B1 | 10/2003 | Parrish | |
| 6,718,476 | B1 * | 4/2004 | Shima | 713/400 |
| 6,757,304 | B1 * | 6/2004 | Nomura et al. | 370/516 |
| 6,907,472 | B2 * | 6/2005 | Mushkin et al. | 709/248 |
| 7,023,884 | B2 * | 4/2006 | Chuah et al. | 370/507 |
| 7,031,329 | B2 * | 4/2006 | Lipsanen | 370/408 |

(Continued)

FOREIGN PATENT DOCUMENTS

EP    1645935 A2 *   4/2006

(Continued)

OTHER PUBLICATIONS

"Clock Distribution Algortihm for Synchronization Network" IBM Technical Disclosure Bulletin, IBM Corp. NewYork, US, vol. 32, No. 8A, Jan. 1, 1990, pp. 17-20, XP000082683 ISSN: 0018-8689.

(Continued)

*Primary Examiner* — Kwang B Yao
*Assistant Examiner* — Jung-Jen Liu
(74) *Attorney, Agent, or Firm* — Sunstein Kann Murphy & Timbers LLP (57) ABSTRACT

A system and method of determining a master node in a computer system having a plurality of nodes includes establishing a hierarchy of master nodes from the plurality of nodes, wherein the master node synchronizes the plurality of nodes in the computer system with a clock value and determining the master node from the hierarchy of master nodes. A system and method of synchronizing a plurality of nodes in a computer system includes determining a master node from the plurality of nodes, sending a clock value from the master node to neighbor nodes of the master node, synchronizing a node clock in each node receiving the clock value if a predetermined period of time has elapsed in each receiving node, distributing a node clock value from each synchronized node to neighbor nodes of the synchronized node, and repeating synchronizing and distributing, wherein synchronizing a node clock in each node receiving the clock value includes each node receiving the node clock value.

20 Claims, 9 Drawing Sheets

U.S. PATENT DOCUMENTS

| | | | |
|---|---|---|---|
| 7,283,568 B2 * | 10/2007 | Robie et al. | 370/503 |
| 2002/0178292 A1 * | 11/2002 | Mushkin et al. | 709/248 |
| 2003/0172179 A1 * | 9/2003 | del Prado Pavon et al. | 709/236 |
| 2004/0001516 A1 * | 1/2004 | Friedrichs et al. | 370/506 |
| 2004/0047307 A1 * | 3/2004 | Yoon et al. | 370/324 |
| 2008/0075120 A1 * | 3/2008 | Fourcand | 370/503 |
| 2008/0084833 A1 * | 4/2008 | Picard | 370/280 |
| 2008/0159457 A1 * | 7/2008 | Nelson | 375/356 |
| 2010/0091760 A1 * | 4/2010 | Yoon | 370/350 |

FOREIGN PATENT DOCUMENTS

| | | |
|---|---|---|
| WO | 2004063913 A1 | 7/2004 |

OTHER PUBLICATIONS

International Search Report dated Jun. 16, 2008.

* cited by examiner

Figure B-14 RTC Conceptual Diagram
FIG. 8

SYSTEM AND METHOD OF SYNCHRONIZING REAL TIME CLOCK VALUES IN ARBITRARY DISTRIBUTED SYSTEMS

FIELD OF THE INVENTION

The invention generally relates to multi-node computer systems, and more particularly, the invention relates to the synchronization of real time clock signal values in multi-node computer systems.

BACKGROUND OF THE INVENTION

Large-scale shared memory multi-processor computer systems typically have a large number of processing nodes, e.g., with one or more microprocessors and local memory, that cooperate to perform a common task. Such systems often use some type of synchronization construct, e.g., barrier variables or spin locks, to ensure that all executing threads maintain certain program invariants. For example, such computer systems may have some number of nodes that cooperate to multiply a large matrix. To do this in a rapid and efficient manner, such computer systems typically divide the task into discrete parts that are executed by one of the nodes. All of the nodes are synchronized, however, so that they concurrently execute their corresponding steps of the task.

The necessary synchronization in a multi-node system often involves a real time clock (RTC) signal value that the nodes synchronize with so that they can operate synchronously. For example, such a global RTC signal value may be useful for generating various interrupts, network throttle triggers, time stamps for error events, etc. Typically, existing systems distribute RTC signal values using dedicated cable wires, but dedicated RTC wires may waste significant amounts of network bandwidth as network link frequency increases. Prior clock distribution systems usually relied on fanning out a single clock signal value, e.g., using a spanning tree, which means that a single node failure could cause the entire RTC system to go down. In addition, a static RTC distributing tree is usually configured by software for a given system, which generally needs to be reconfigured whenever there is a change in the system. This results in significant down time for the system when such events occur.

SUMMARY OF THE INVENTION

In accordance with one aspect of the invention, a method of determining a master node in a computer system having a plurality of nodes includes establishing a hierarchy of master nodes from the plurality of nodes, wherein the master node synchronizes the plurality of nodes in the computer system with a clock value and determining the master node from the hierarchy of master nodes.

In accordance with related embodiments, establishing a hierarchy of master nodes may include configuring the plurality of nodes by a user or by the computer system. The method may further include selecting a backup master node from the hierarchy of master nodes if the plurality of nodes do not receive the clock value after a predetermined period of time, so that the selected backup master node becomes the master node. The method may further include resetting the master node by reconfiguring the hierarchy of master nodes. The method may further include resetting the master node by selecting a node from the plurality of nodes and sending out the clock value from the selected node after a predetermined period of time has elapsed in at least a portion of the plurality of nodes. The method may further include resetting the master node by reconfiguring the hierarchy of master nodes, selecting a node from the reconfigured hierarchy of master nodes, and sending out the clock value from the selected node after a predetermined period of time has elapsed in at least a portion of the plurality of nodes. The method may further include adding at least one node to the plurality of nodes, wherein establishing a hierarchy of master nodes from the plurality of nodes includes the plurality of nodes and the at least one node added.

Illustrative embodiments of the invention may be implemented as a computer program product having a computer usable medium with computer readable program code thereon. The computer readable code may be read and utilized by a computer system in accordance with conventional processes.

In accordance with another aspect of the invention, a method of synchronizing a plurality of nodes in a computer system includes sending a clock value from a master node to neighbor nodes of the master node, synchronizing a node RTC value in each neighbor node with the clock value received to derive a synchronized node clock value if a predetermined period of time has elapsed in each neighbor node, distributing the synchronized node clock value from each synchronized node to neighbor nodes of the synchronized node, and repeating synchronizing and distributing, wherein synchronizing a node clock value includes synchronizing a node RTC value with the synchronized node clock value distributed.

In accordance with related embodiments, synchronizing a node RTC value may further include adjusting a ratio based on a function of a received clock value, the node RTC value and an estimate of the time period since the synchronizing step last occurred, wherein the received clock value is the clock value or the synchronized node clock value. The method may further include restarting the predetermined period of time in each synchronized node. Sending a clock value from a master node may occur at a predetermined update interval. The method may further include determining a primary master node from a hierarchy of master nodes selected from the plurality of nodes. Determining a primary master node may further include selecting a backup master node from the hierarchy of master nodes after a predetermined period of time has elapsed, so that the selected backup master node becomes the primary master node. The backup master node may count a specified number of missed updates before becoming the primary master node. The plurality of nodes may be configured with a hierarchy of update intervals to provide the hierarchy of master nodes. Fan-in fences and fan-out fences may be implemented for individual ports in the synchronizing step and the distributing step. Synchronizing a node RTC value may include adjusting the clock value, the synchronized node clock value, or both to compensate for delays.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Various embodiments of the present invention relate to a system and method for distributing and maintaining an accurate global real time clock value in arbitrary distributed systems, e.g., systems with dynamic partitions and unreliable networks. Embodiments designate a "master" node within a given partition of a multi-node system which provides the global real time clock value to the other nodes within the partition. Various embodiments of the present invention also relate to a system and method for determining a master node to send the clock value in the arbitrary distributed systems. Embodiments are based on use of regular network messages and in-band bandwidth to maintain a self-adjustable, globally consistent timing sequence even when system topology regularly changes. Embodiments enable the use of standard commercial cables, such as InfiniBand cables, increasing utilization of any given cable and saving overall system cost. Also, partitionable systems are afforded much more flexibility and associated system down time is significantly reduced. In addition, embodiments enable the systems to scale without degradation, to offer a flexible network topology that does not require a spanning tree, and to have a robust RTC scheme, which is needed in software synchronization, that may be used on any available network to distribute the clock value.

Figure 1:
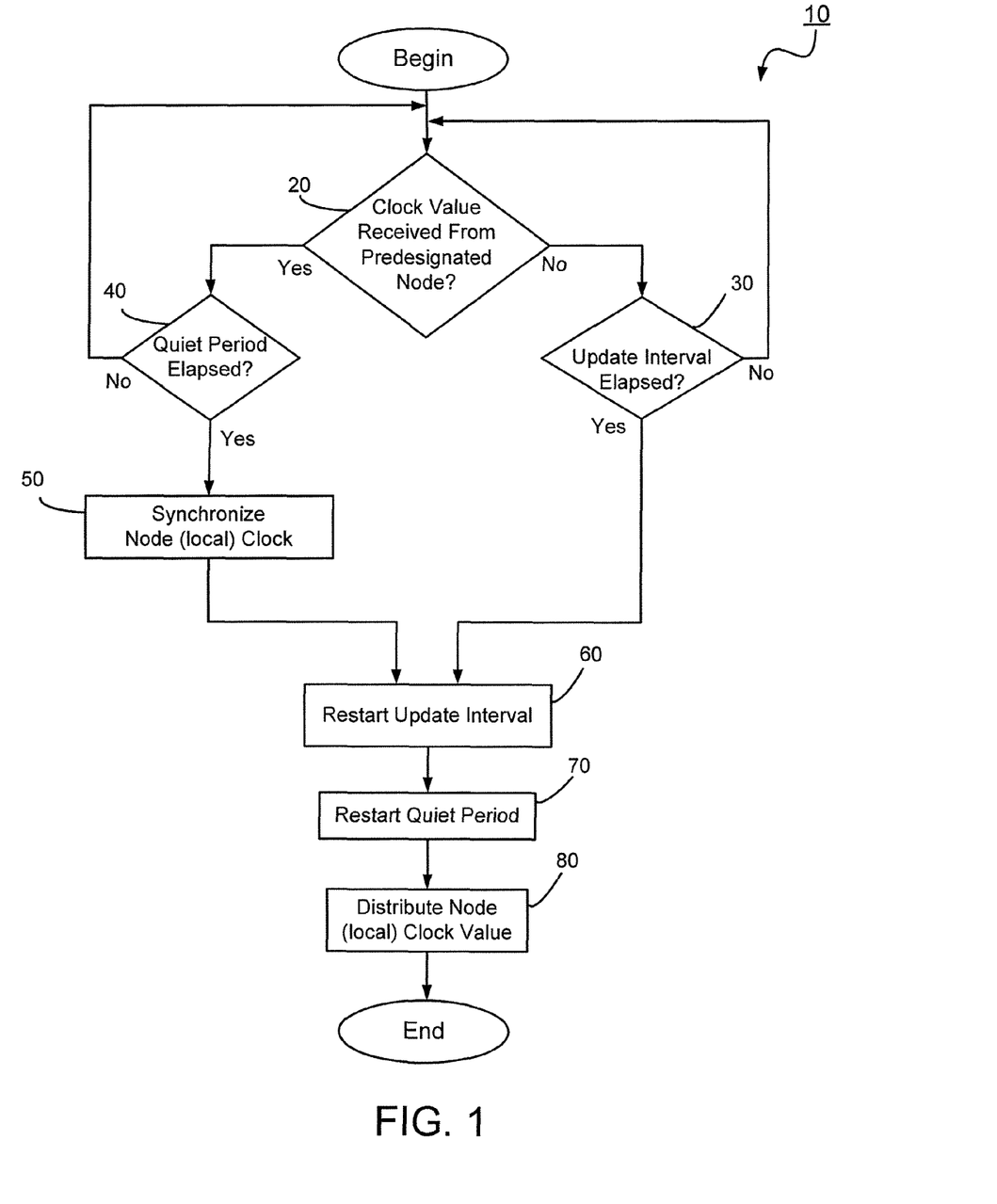
FIG. 1 shows a method of distributing a clock value according to an embodiment of the present invention.

FIG. 1 shows a method of distributing a clock value 10 in a multi-node computer system according to an embodiment of the present invention. In order to ensure that all of the nodes in the network are approximately synchronized, the master node periodically sends out a clock value at a predetermined update interval that the other nodes synchronize to. The update interval may be any length of time and may vary depending on a variety of factors, e.g., system processing requirements, amount of nodes in the system, etc. In addition, the nodes within the network may have various update intervals, with the designated master node in the system having the shortest update interval.

In step 20, the method 10 verifies whether the clock value is received in a given node within the system. When no clock value is received in a given node, the method verifies whether a predetermined update interval has elapsed in that node (step 30). Since the master node has the shortest update interval, the master node proceeds to step 60 before any of the other nodes in the system. Thus, in step 60, the update interval in the master node is reset or restarted. In addition, a quiet period is reset or restarted within the master node (step 70). The quiet period or an ignore interval is a period of time after a node updates its clock value in which the node ignores any other clock values received. The quiet period may be varied depending on a variety of factors, e.g., amount of nodes in the system, propagation delays, etc., but is generally less than the shortest update interval in the system. For example, in one embodiment, the update interval for the master node may be one millisecond and the quiet period for all the nodes may be 100 nanoseconds. In step 80, the master node sends out or distributes its clock value to all of its neighbor nodes. Then, for each of the master clock's neighbor nodes, the method 10 verifies whether the clock value received in these nodes is from a pre-approved or pre-designated neighbor node (step 20). For example, the network of nodes may be in communication with a second network of nodes but separated or partitioned from the second network, e.g., for protection purposes. Therefore, the two networks may allow some communication or messages to be transmitted between the networks, but the nodes from the second network may not listen to and synchronize to the clock value of the first network.

Here, the master node is a pre-approved node. Thus, once the neighbor nodes receive the clock value, the method 10 verifies that the predetermined quiet period has elapsed in each node (step 40). If the quiet period has elapsed, each neighbor node synchronizes its node clock with the received clock value (step 50). During synchronizing, each node has a local clock value that is adjusted and updated based on the externally received clock value, its current local clock value, and certain on-chip delays, e.g., propagation delays in sending the clock value to neighbor nodes, adjustment delays in processing and adjusting the clock value within the node, etc. Based on the local clock adjustment, the rate of the local clock may be increased, decreased or kept the same. If the node does not have a current local clock value, the externally received clock value becomes the new local clock value and adjustment to the local clock value does not occur. After changes to a network, e.g., a new master node is established, the different nodes in the system may have slightly different local clock values from the master node's clock and/or each other. After a settlement period, however, the local clocks on the nodes are kept similar or substantially identical to the master node's clock by this periodic adjustment of their local clock values.

After synchronizing to the externally received clock value, each neighbor node restarts its update interval (step 60), restarts its quiet period (step 70), and distributes its updated local RTC value to each of its selected neighbor nodes (step 80), which may include the source node. In this instance, the master node may receive a clock value from an approved node (step 20), but the quiet period has not elapsed for the master node (step 40), so the received clock value is ignored. Similarly, if the quiet period has not elapsed in any neighbor node receiving the clock value (step 40), that node also ignores its received clock value. If the quiet period has elapsed in a node, each neighbor node receiving the clock value synchronizes its node clock with the received node clock value (step 50), restarts its update interval (step 60), restarts its quiet period (step 70) and distributes its updated local RTC value to all of its selected neighbor nodes (step 80). This process continues with the nodes synchronizing, restarting and distributing their local node clock values throughout the network of nodes.

If the master node does not send out its clock value at its update period or the clock value is not received in the network of nodes, for whatever reason, e.g., the master node malfunctions or is removed from the network of nodes, a new master node may be established or determined. The new master node may be determined from the plurality of nodes in the network using a hierarchy of master nodes. The hierarchy may be established, e.g., by a user or by the computer system, in a predetermined manner or dynamically configured. For example, the hierarchy of master nodes may be determined by assigning an identification or a rank to each node within the system. Some convention may then be used to establish where the nodes rank in the hierarchy of master nodes. For instance, the lowest ranked node may be designated the master node, the next lowest ranking node may be designated the first level backup master node, the next lowest ranking node may be designated the second level backup master node, etc. The lowest ranking node is given or assigned the shortest update interval, the first level backup master node the next shortest update interval, the second level backup master node the next shortest update interval, etc. Thus, when the master node's update interval elapses and the nodes still have not received a clock value, the first level backup master node is the next node in the system to proceed to step 60 since it has the next shortest update interval. The first level backup master node becomes the new master node and restarts its update interval (step 60), restarts its quiet period (step 70) and distributes its clock value to each of its neighbor nodes (step 80). The method of determining a master node is described in more detail below with respect to FIG. 3.

To further illustrate embodiments of the present invention discussed above, FIG. 2 shows a simplified view of a multi-node network. As shown, Node A is assigned Rank 0 and given the lowest ranking in the hierarchy of master nodes. Node B is assigned the next level rank, Rank 1. Similarly, Nodes C-Q are assigned Ranks 3-16, respectively. In this scenario, Node A is designated the master node. Node A sends out its clock value to Nodes B, C, D and E once every update interval. When Nodes B-E receive the master node's clock value, each node verifies that the predetermined quiet period has elapsed. In this example, Nodes B-E have not received the clock value since the last update interval, so the quiet period has elapsed in each node. Each node then synchronizes its node clock with the received clock value, restarts its update interval and restarts its quiet period.

Figure 2:
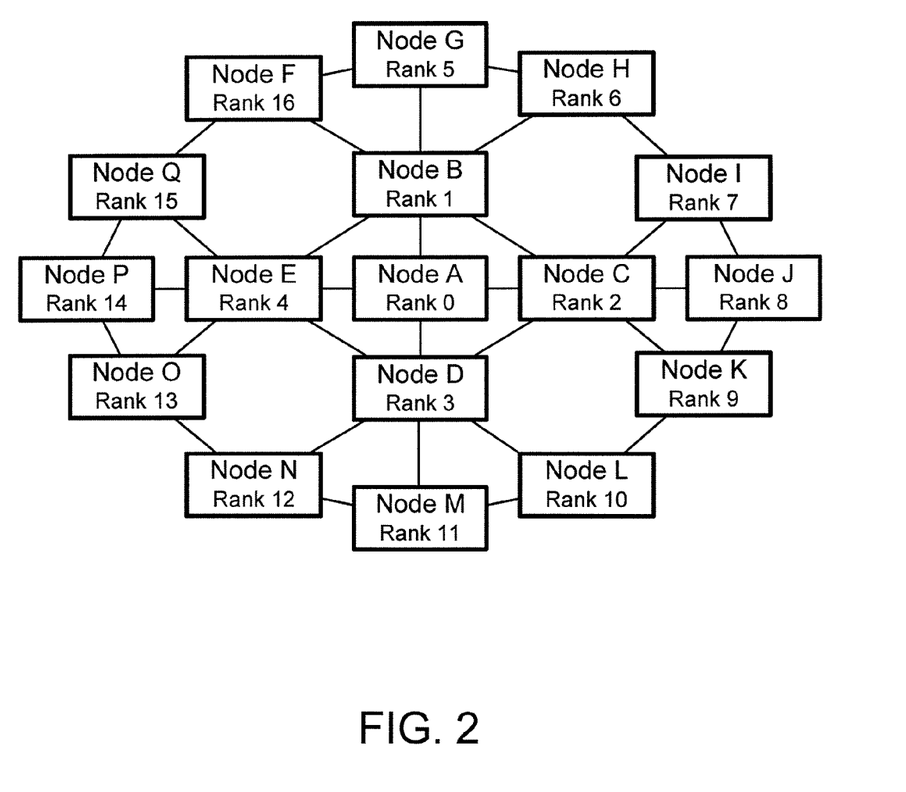
FIG. 2 shows a multi-node computer system according to an embodiment of the present invention.

Nodes B-E then distribute their respective node clock values to each of their neighbor nodes. For example, Node B distributes its node clock value to Nodes A, C, E, F, G and H, Node C distributes its node clock value to Nodes A, B, D, I, J and K, Node D sends its node clock value to Nodes A, C, E, L, M and N and Node E sends its clock value to Nodes A, B, D, O, P and Q. For Node B's neighbor nodes, Node A ignores the clock value since Node A just synchronized its clock value, reset its update interval and quiet period and distributed its clock value. Thus, Node A's quiet period has not elapsed. Similarly, the quiet periods in Nodes C and E have not yet elapsed because both nodes just received a clock value and reset its quiet period, so both nodes ignore the clock value received from Node B. However, Nodes F, G, and H have not received a clock value since the last update interval, so the quiet period has elapsed in each of these nodes. Nodes F, G, and H then synchronize each node clock in the respective nodes with the received clock value. Similarly, for Node C's neighbor nodes, Nodes A, B and C ignore the received clock value and Nodes I, J and K synchronize their node clocks with the received clock value, for Node D's neighbor nodes, Nodes A, C and E ignore the received clock value and Nodes L, M, and N synchronize their node clocks with the received clock value, for Node E's neighbor nodes, Nodes A, B and D ignore the received clock value and Nodes O, P and Q synchronize their node clocks with the received clock value. Each of the nodes that synchronizes its node clock with the received clock values, then restart its update interval and its quiet period.

Nodes F-Q then distribute their respective node clock values to each of their neighbor nodes. For example, Node F distributes its node clock value to Nodes Q, B and G, Node G distributes to Nodes F, B and H, Node H distributes to Nodes G, B and I, etc. In this instance, however, every node that receives a clock value has recently received a clock value, synchronized to the clock value, restarted its update interval and restarted its quiet period. Thus, every node that receives this round of the clock values ignores the received clock value and the process ends until the next update period, or until there is a change in the master node or to the network of nodes, as discussed in more detail below.

Figure 3:
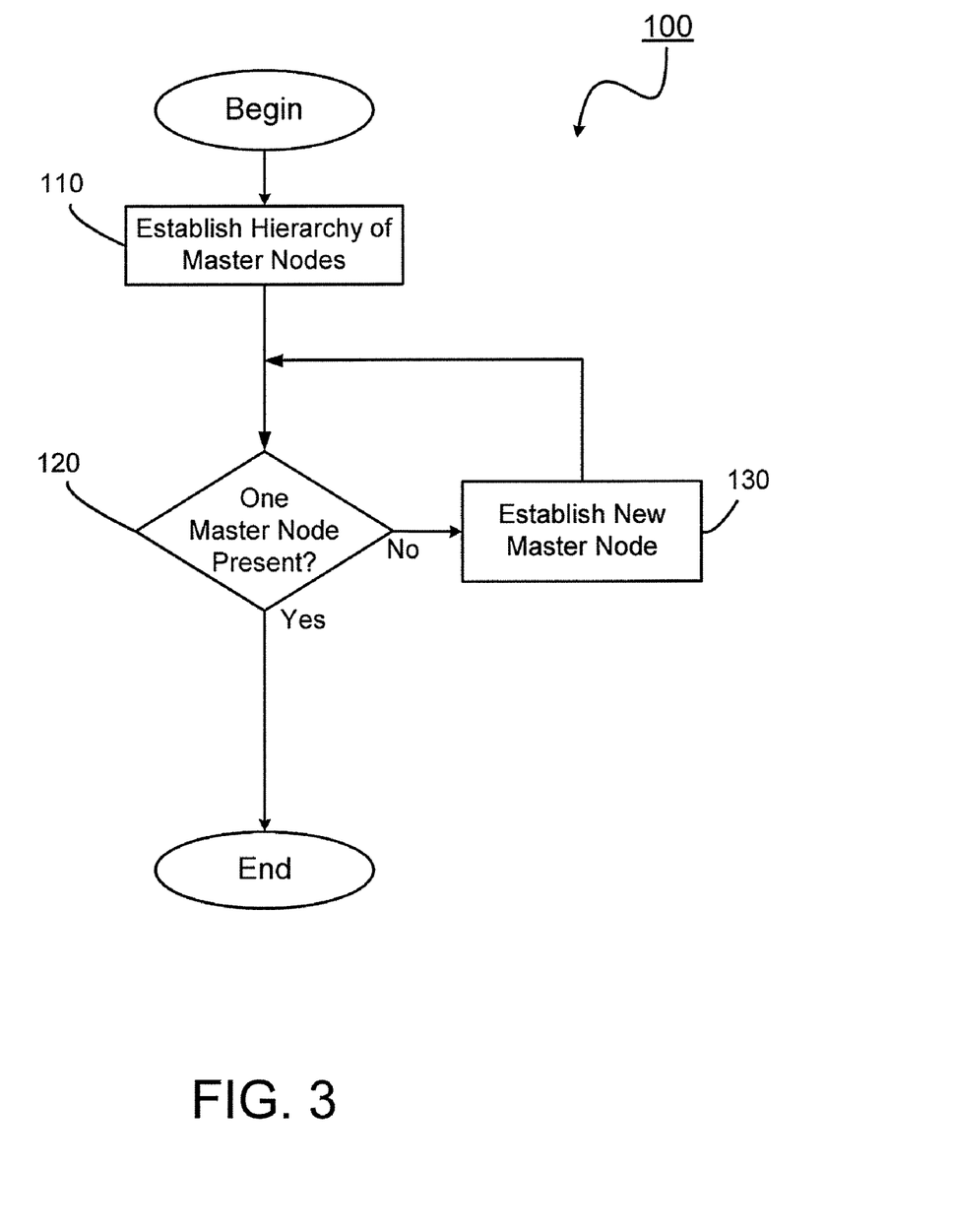
FIGS. 3 and 3A show methods of determining a master node according to embodiments of the present invention.

FIG. 3 shows a method of determining a master node 100 in a multi-node computer system according to an embodiment of the present invention. In step 110, a hierarchy of master nodes may be established or determined from the plurality of nodes in the computer system, e.g., as discussed above with regard to FIG. 1. However, in arbitrary distributed systems, such as systems with dynamic partitions and unreliable networks, nodes may be removed from or added to the network of nodes and fail to receive the master node's clock value or the master node may malfunction and fail to send out its clock value. Thus, in step 120, the method 100 verifies that one master node is present in the system. If there is no master node present and the nodes in the system have not received a clock value within the master node's update interval, a new master node may be established (step 130).

As mentioned above, each node within the network may have a different update interval based on its ranking within the hierarchy of master nodes. When the system fails to receive a clock value, the next designated level of master node in the hierarchy of master nodes waits until its specified update interval elapses before sending out its clock value. If this first level backup master node receives a clock value during this time, the node does not assume the role of master node and synchronizes to the received clock value and distributes its updated node clock value as previously described. However, if the clock value is still not received by the first level backup master by the time its update interval elapses, the first level backup master becomes the master node and sends out its node clock value to each of its neighbor nodes. Similarly, if the first level backup master node is unable to send a clock value, the second level backup master node waits until its update interval elapses and then sends out its clock value, etc.

This process may continue throughout the hierarchy of master nodes, until a new master node is established and a clock value is received in the network of nodes. The various update intervals of the nodes may be any length of time, e.g., a multiple of the master node's update interval or any other predetermined length of time. For example, the master node's update interval may be one (1) millisecond, the first level backup master node may be 1.1 milliseconds, the second level backup master node may be 1.2 milliseconds, etc. Some nodes in the network may be designated a slave node, incapable of ever becoming a master node. In this case, the update interval for the slave node(s) is set to an infinite length of time, so that its update interval does not ever elapse and the node does not ever assume the role of master node and send out its clock value without first receiving a clock value and synchronizing to it.

Figure 3A:
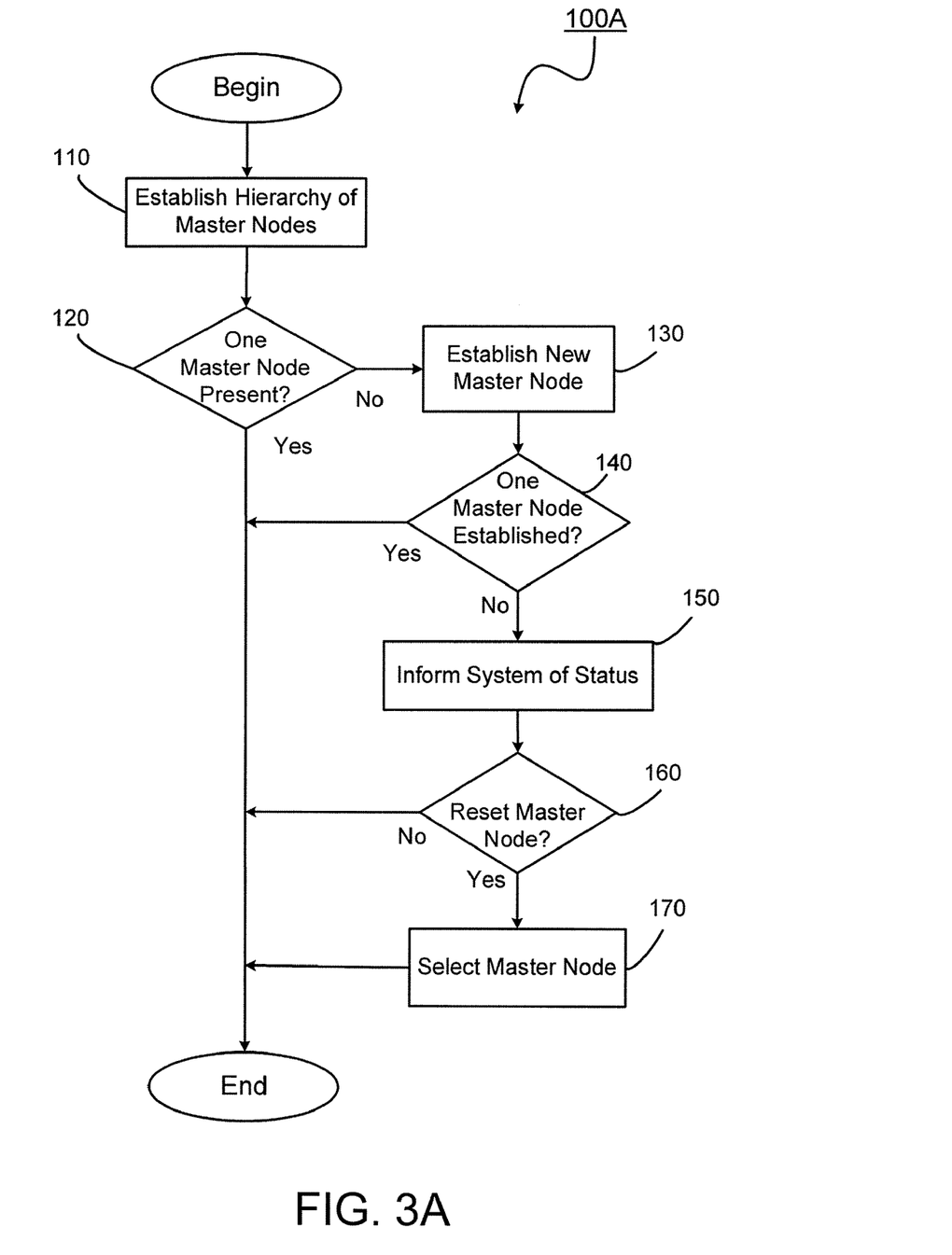

FIG. 3A shows another method of determining a master node 100A according to an embodiment of the present invention. The method 100A may be used if two or more similarly ranked master nodes are present, e.g., when a new group of nodes joins an existing network of nodes. For example, if two or more first level backup master nodes with similar update intervals assume the role of master node or a new group of nodes joins an existing network of nodes and both groups have a similarly ranked master node, then more than one master node may be present in the system and may be sending out its clock value at its designated update interval. As previously described with respect to FIG. 3, the method 100A may establish a hierarchy of master nodes (step 110), verify that one master node is present in the system (step 120) and, if one master node is not present, a new master node may be established (step 130). For example, the system may establish one master node by waiting the various update intervals for one node to assume the role of master node or by letting the nodes reconcile to one master node, if possible. In step 140, if one master node is not established, the system may be informed of the status of the master nodes (step 150). In step 160, the system may decide whether or not to reset the master nodes. For example, if two or more master nodes are established, but the network is remaining relatively synchronized, the system may decide to allow two or more master nodes to co-exist. Alternatively, if the system decides to reset the master node, the system selects the master node to send out the clock value to the network of nodes (step 170). The system may select the master node in a number of ways. For instance, the system may select one node to send out a clock value that is timed such that all nodes are listening and will synchronize to that node's clock value. For example, the selected master node sends out its clock value after the quiet periods of all or substantially all of the nodes in the network have elapsed, but before the update intervals have elapsed or are soon to elapse. The system may reconfigure the hierarchy of master nodes in the network or may selectively reconfigure a portion of the nodes, e.g., the two or more nodes that are competing to be the master node, so that only one node is the next designated master node.

Figure 4:
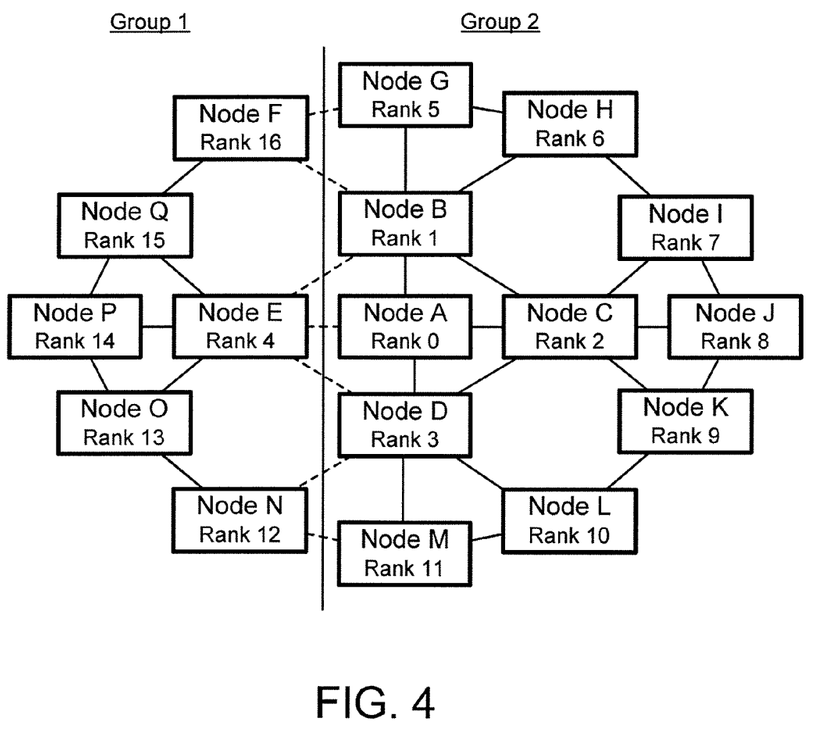
FIG. 4 shows a multi-node computer system separated into two groups according to an embodiment of the present invention.
Figure 5:
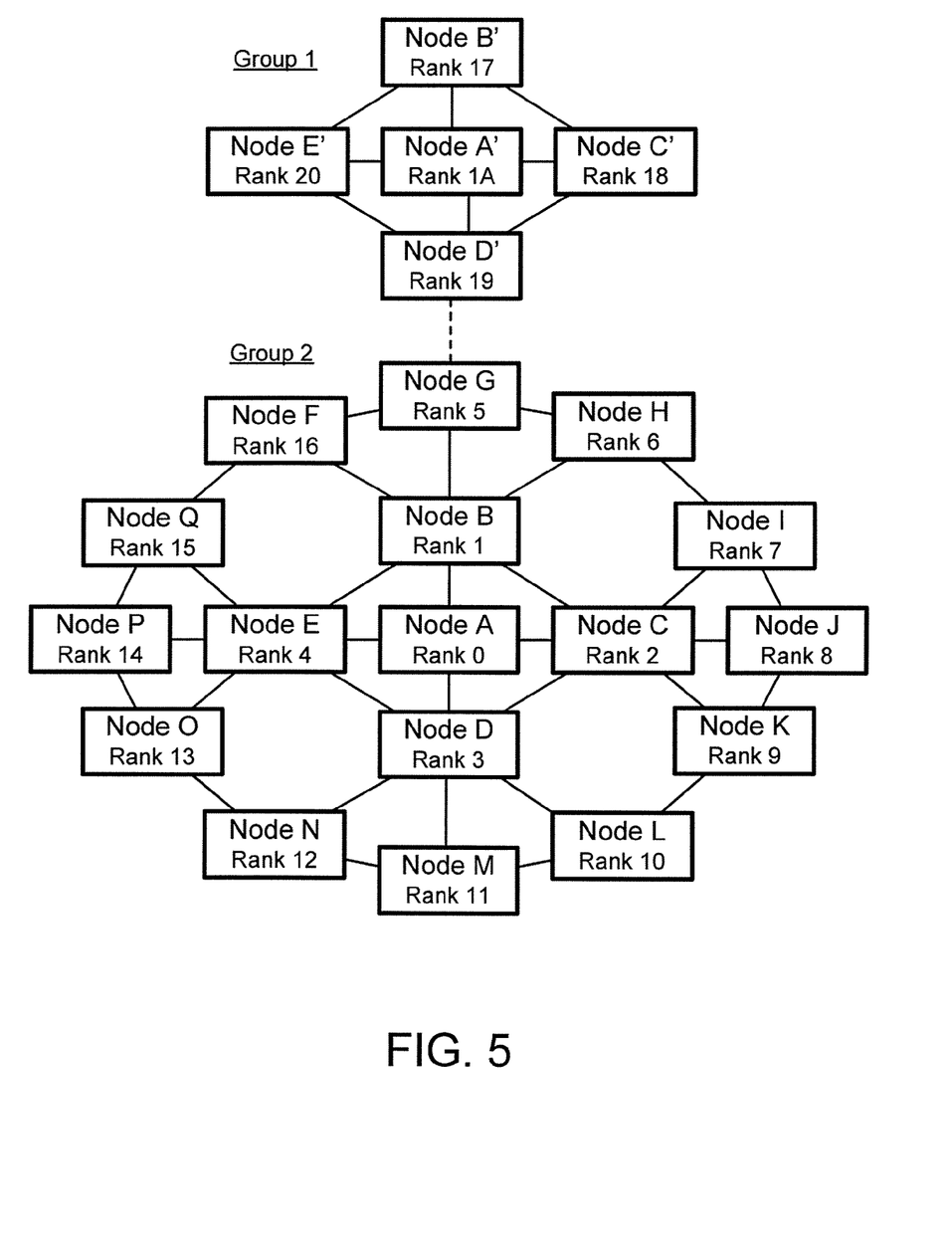
FIG. 5 shows two groups joining in a multi-node computer system according to an embodiment of the present invention.

FIGS. 4 and 5 show simplified views of a multi-node computer system separated or partitioned into two groups and two groups joining into one system, respectively, according to embodiments of the present invention. As shown in FIG. 4, the network of nodes are separated into two groups of nodes, Group 1 containing Nodes E, F and N-Q and Group 2 containing Nodes A-D and G-M. In this configuration, when Node A sends out its clock value at its update interval, the nodes in Group 1 do not receive the clock value or ignore the received clock value as coming from a non-approved node. Similarly, when Node B and D each send out its updated node clock values, the Group 1 nodes ignore or do not receive the clock values. In this scenario, Node E is the lowest ranking node in the Group 1 nodes and has the shortest update interval of the Group 1 nodes. Thus, Node E's update interval eventually elapses and it assumes the role of master node and sends its clock value to Nodes O, P and Q. If Node E is removed or malfunctions, Node N waits its update interval and then assumes the role of master node and sends its clock value to Node O, etc.

As shown in FIG. 5, a second group of nodes, Group 2, may join an existing network of nodes, Group 1. In this scenario, Group 1 contains Nodes A'-E' with Node A' designated the master node, and Group 2 contains Nodes A-Q with Node A designated as the master node. When the two groups join, the system may establish a new hierarchy of master nodes so that there are no similarly ranked nodes or the system may let the nodes attempt to reconcile to one master node. For example, depending on the timing of the update intervals of the two groups, both Nodes A' and A may send out clock values around their respective update intervals. If the update intervals of the two groups are somewhat synchronized or approximately in phase with one another, then Nodes B'-E' synchronize to Node A' and Nodes B-F, H-Q synchronize to Node A. Node G may synchronize to either Node A or Node A'. As previously discussed, if both Nodes A' and A continue in the system as master nodes, both master nodes may be allowed to co-exist or the system may decide to reset the master node. If the update intervals are not synchronized or in phase, however, either Node A' or Node A may be next to send out the clock value and either Node A' or Node A may be established as the new master node depending on when in the respective groups' update intervals the two groups join. For example, if the update intervals are slightly out of phase with Group 1 slightly ahead of Group 2, and Group 2 joins Group 1 right after Node A' sent out a clock value, but before Node A sends out its clock value, then Group 1 ignores the received clock value when Node A sends out its clock value assuming that the quiet periods in Nodes A'-E' have not yet elapsed. Then, when Node A' is sending out its clock value again almost a complete update interval has elapsed for the Group 2 nodes. Thus, all nodes in Group 1 and Group 2, including Node A, have quiet periods that have elapsed, so all nodes listen and synchronize to Node A'. Similarly, if the update intervals are slightly out of phase, but Group 2 is slightly ahead of Group 1 and the groups join after Node A sends a clock value, but before Node A' sends a clock value, then the Group 2 nodes ignore the clock value sent from Node A', but all nodes subsequently synchronize to Node A when it sends the clock value at the next update interval. Also, if the update intervals are slightly out of phase, but the two groups join after the update intervals of both Nodes A and A', then both groups synchronize to which ever node sends its clock value next, provided that the quiet periods in both groups have elapsed.

If a node or nodes joins an existing network of nodes, and the joining node(s) do not have an established master node and/or a history with update intervals, quiet periods and/or local clock values, etc., the joining node(s) may listen to the distributed clock value for more than one update interval before synchronizing and distributing its node clock value to its neighboring nodes. Similarly, the joining nodes may listen and synchronize to the received clock value, but not distribute its own clock value for more than one update interval.

Although various nodes, node rankings and configurations have been discussed for distributing a clock value with respect to FIGS. 2, 4 and 5, it will be apparent to those skilled in the art that any number of nodes, ranking configurations, and/or arrangements may be used. In addition, FIGS. 4 and 5 have been discussed with respect to two groups joining or separating, however, it will be apparent to those skilled in the art that any number of groups may be joined or separated in the system. Also, it will be apparent to those skilled in the art that in a multi-node network, neighbor nodes do not need to be physically connected or physically adjacent to one another, but may be designated "neighbor nodes" with information being communicated from one node to its designated neighbor nodes through, for example, wireless techniques.

Figure 6:
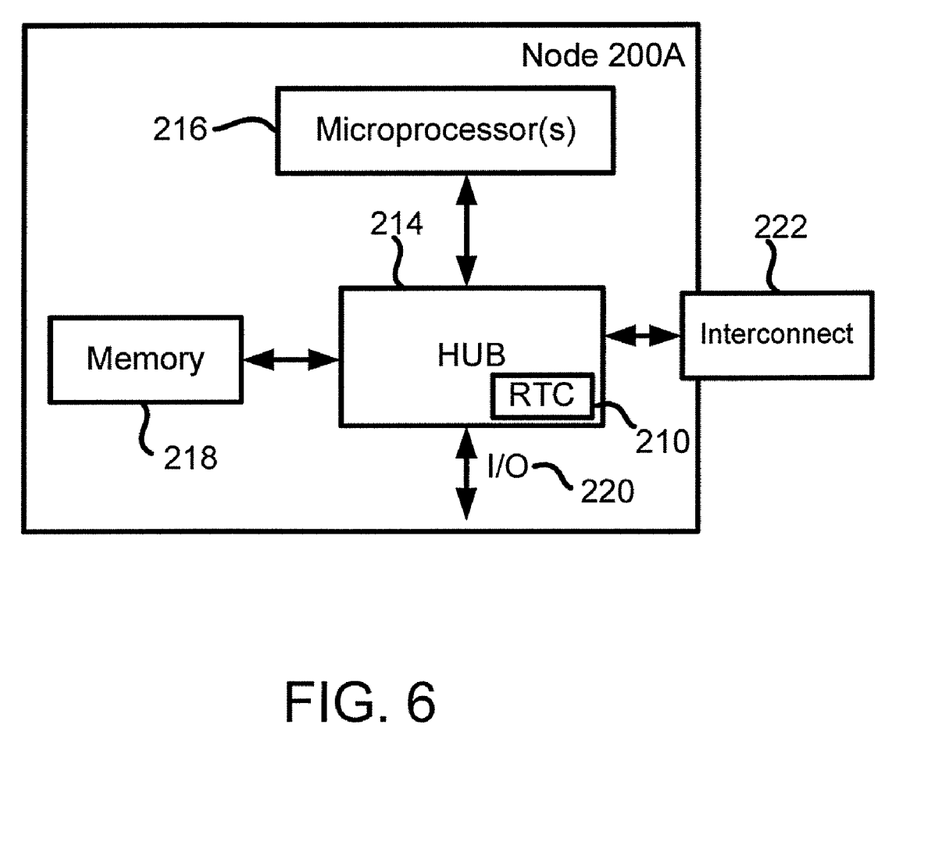
FIG. 6 shows a node in a multi-node computer system according to an embodiment of the present invention.

FIG. 6 schematically shows one node of a multi-node computer system that may be used in embodiments of the present invention. As shown, Node 200A has a plurality of components coordinated by a HUB chip 214, e.g., a gate array chip and/or a microprocessor, customized to perform a number of functions. The components coupled with the HUB chip 214 include an RTC system 210 for maintaining an accurate RTC value and determining master nodes, one or more microprocessors 216 for generating data words, among other things, memory 218 for storing data, and an I/O interface 220 for communicating with devices that are external to the computer system 200. The computer system includes an interconnect 222 to other nodes in the computer system. The microprocessor(s) 216 on the various nodes in the system may cooperate to perform a common task. For example, at least one of the microprocessors 216 on each of the nodes may share responsibilities with those on other nodes, e.g., for multiplying a complex matrix. Thus, certain data to be processed may be located on one of the nodes and may need to be accessed by one or more other nodes to complete the operation.

In one exemplary computer system, the microprocessors 216 include two 4X-ITANIUM microprocessors (distributed by Intel Corporation, Santa Clara, Calif.) that generate 128 bit words for storage in a plurality of dual in-line memory modules (DIMM) shown schematically as memory 218 in FIG. 6. Each DIMM illustratively has eighteen X4-type random access memory chips, e.g., DRAM chips, for storing data generated by the microprocessors 216, and is connected to one of four 72 bit buses (not shown). Accordingly, HUB chip 214 may transfer 72 bits of data across each bus per clock cycle. The buses illustratively operate independently and transmit data in a synchronized manner.

It should be noted that discussion of a specific Node 200A as shown in FIG. 6 is exemplary and thus, not intended to limit any aspect of the present invention. Accordingly, embodiments of the present invention apply to any multi-node computer systems having any number of nodes, e.g., hundreds of nodes or fewer. In addition, although the node has been shown as having certain components, it will be apparent to those skilled in the art that different components and/or configurations may be used in the various nodes (e.g., a router-only node).

Figure 7:
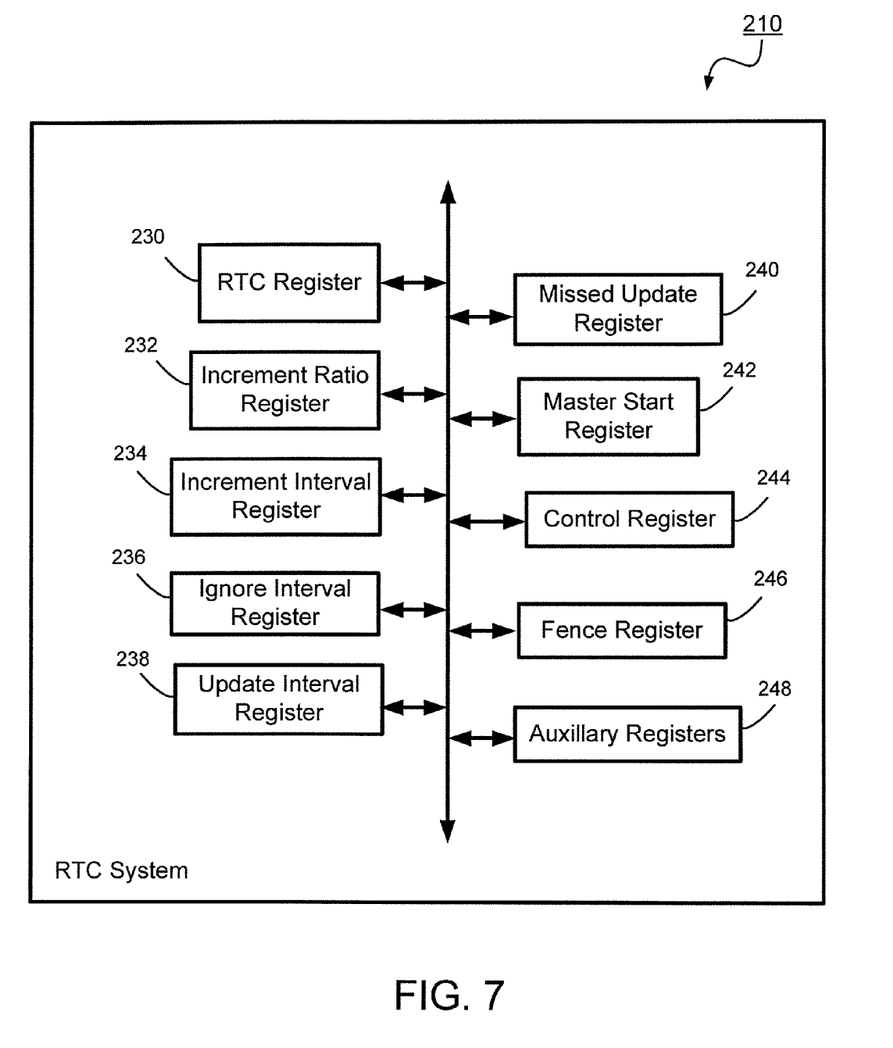
FIG. 7 shows an RTC system for synchronizing a clock signal according to an embodiment of the present invention.
Figure 8:
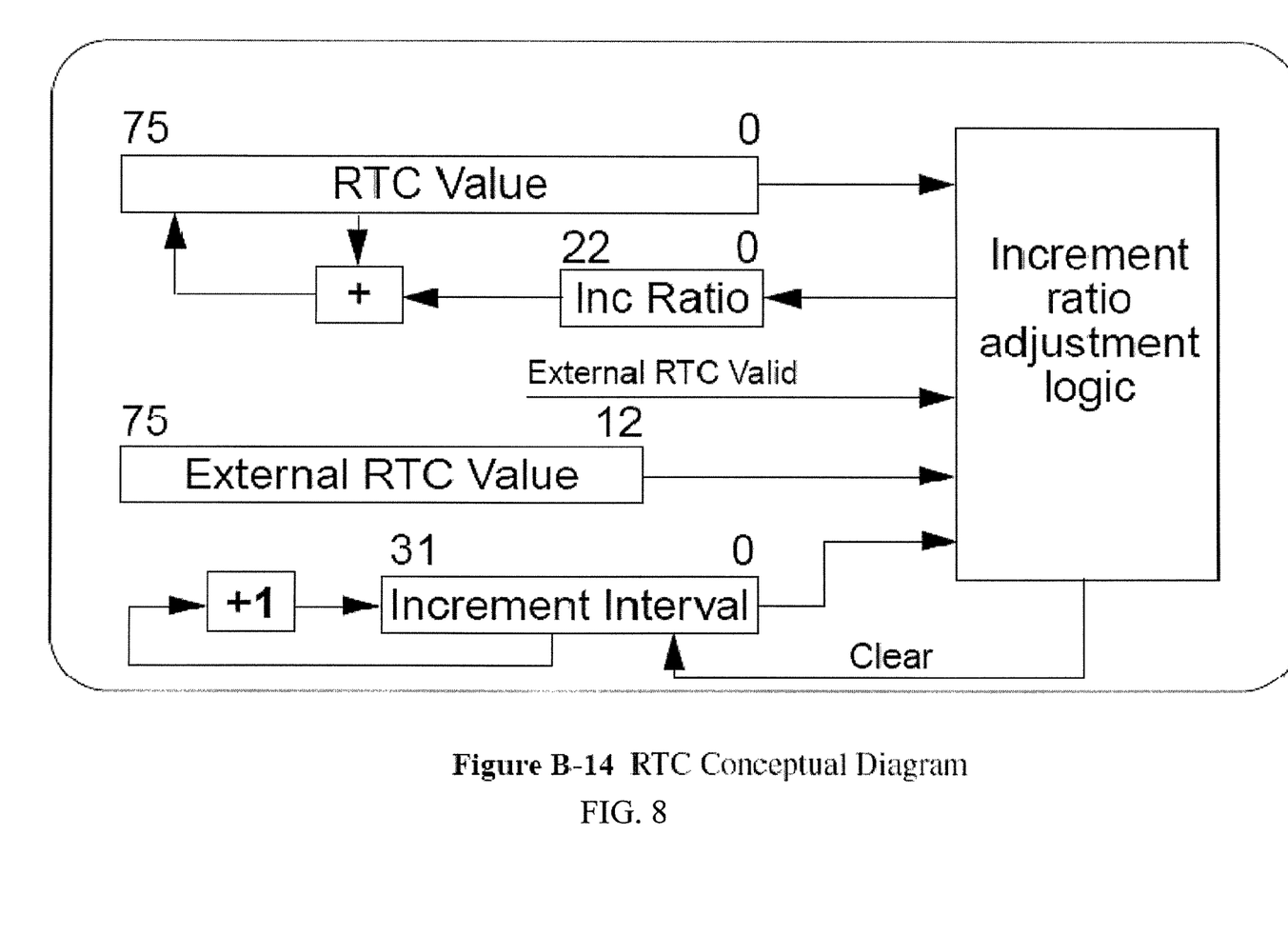
FIG. 8 shows a system for adjusting a clock value in a node according to an embodiment of the present invention.

Embodiments of the present invention may be implemented in a variety of ways. FIG. 7 shows a schematic diagram of an RTC system 210 according to an embodiment of the present invention. The RTC system 210 is used to keep all nodes within any given partition or network synchronized in time. The RTC system 210 may include an RTC Register 230, an Increment Ratio Register 232, an Increment Interval Register 234, an Ignore Interval Register 236, an Update Interval Register 238, a Missed Update Register 240, a Master Start Register 242, a Control Register 244, a Fence Register 246 along with several auxiliary registers 248 that may control behavior of the real time clock system and collect statistics. Referring also to FIG. 8, an adjustment system may use the resources of the RTC Register 230, the Increment Ratio Register 232, the Increment Interval Register 234, and the Update Interval Register 238.

The adjustment system maintains an accurate copy of system wide real time clock value. For example, a 76 bit value may be used, which contains the full RTC clocks along with fractions to allow the local node RTC to be nearly as precise as the local chip clock. The upper 56 bits may contain the whole number of clocks that the master node has counted while the lower 20 bits may be used to keep the free running or node clock on the chip synchronized. Such a design may allow chips of different core frequencies to be part of the same RTC fan out tree. For instance, the RTC value on a chip may be advanced by an increment ratio on each core local clock of the chip. The copies of the RTC value on different chips in a multi-node system are kept similar or substantially identical by adjusting their current values based on the external RTC value that is periodically received from its neighboring nodes. Neighboring chips may exchange their RTC values via RTC update messages (e.g., SN3NET LLP maintenance messages).

The adjustment system adjusts an increment ratio based on the difference between the received RTC value, the local value, and certain on-chip delays. If the difference is positive, the ratio is increased. Similarly, if the difference is negative, the ratio is decreased and if the difference is zero, the ratio is unchanged. The adjustment system may have several RTC fan-in ports and fan-out ports, e.g., four in an exemplary hub. Each of these ports may contain 64 bits data and a valid bit. The increment ratio may be used at all fan-out ports for on-chip delay adjustment caused by factors such as value traveling and LLP retries.

The RTC Register 230 may contain the upper 64 bits of the RTC value. The lower 8 bits of the register may be the most significant fraction bits and most likely will be discarded when using this register in an OS environment. The lower 12 bits of the RTC value may be stored in a control register. The RTC Register 230 may be software writable and the hard reset value may be zero. The Increment Ratio Register 232 may be a 23 bit register. The least significant bits [19:0] may be the fractional clock count. The upper 3 bits [22:20] may be the whole number of clocks to increment. The Increment Ratio Register 232 may be software writable and may have a default of 0.0. The master node may set this to 0.1 and all local node clocks may self-adjust to the correct increment. The Increment Interval Register 234 may have 32 bits and may hold the count of local chip clock since the last accepted update interval. It is used to calculate the adjustment for the Increment Ratio Register 232. The value in the Increment Interval Register 234 is zeroed every time an update is performed. Reset value is zero.

The Ignore Interval Register 236 may have 32 bits and may hold the value in each local core node clock for the ignore timer or quiet period interval. During the time that the ignore timer is non-zero, no adjustment to the local RTC value in a node may be done. The value should be set to a time no less than it takes to travel on a channel. For example, reset default may be set to 50,000. The Update Interval Register 238 may be a 32 bit register and may hold the number of core clocks between updates for a primary master node and any backup master RTC nodes. The Update Interval Register 238 may not be used if the node is not designated in the hierarchy of master nodes and is strictly meant to be a slave node. However, the Update Interval Register 238 may be programmed if statistics rely on it for missed updates. For example, any master node or backup master node in the system may have this register set to 1,000,000. The register may be programmed to send RTC updates quicker if many dropped updates occur.

The Missed Update Register 240 may be a 16 bit register that counts the number of consecutively missed update intervals. The Missed Update Register 240 may be reset to zero after an update is received. The Master Start Register 242 may be a 16 bit register that contains the number of consecutively missed update intervals before a next level backup master node takes control and starts broadcasting or sending updates. A zero in the Master Start Register 242 may indicate that this node is the primary master node. The Master Start Register 242 may be ignored on all other slave nodes.

The Control Register 244 may be an 18 bit register that may contain the following fields: Enable, Update Enable, Master, Start, Clear, RTC Clear, Fan-in fence, Fan-out fence, and RTC low. The Enable bit may enable or disable the circuit, e.g., default to disable. The Update Enable bit may enable or disable the update of the Increment Ratio Register 232, e.g., default to enable. The Master bit may indicate a chip is a master or slave node, e.g., default to slave. Writing a 1 by software to the Start bit may generate a start message on a master node. Writing a 1 to the Clear bit, e.g., generating a pulse value, may reset all registers in the adjustment system. Writing a 1 to the RTC Clear bit, e.g., generating a pulse value, may set the RTC value in the RTC Register 230 and Control Register 244 to zero. The RTC low field may contain the lowest 12 bits of the RTC value [11:0].

The Fence Register 246 may be an 8 bit register that may contain two fields: Fan-in fence and Fan-out fence. The Fan-in fence field, e.g., 4 bits, may indicate which ports define legitimate fan-ins for RTC update, e.g., default to "off." The Fan-out fence field, e.g., 4 bits, may indicate which ports are to fan-out the update, e.g., default to "off."

The RTC system 210 may include a set of miscellaneous registers 248 that may keep track of various statistics. For example, one register may count the number of updates and may get an average update interval. Another one may gather settling time and number of times the Increment Ratio Register 232 was adjusted and what the average adjustment is, etc.

For any recently powered up chip, the reset RTC may ignore any updates received until the Enable in the Control Register 244 is set. Once the Enable bit is set, on each core clock, the content of Increment Ratio Register 232 may be added to the current RTC value in the RTC Register 230 and Control Register 244. The increment interval may be incremented and the update interval timer may be decremented.

In operation, at any time when software writes a 1 to the Start bit in the Control Register 244, if the Master bit is set and the ignore timer is zero, an update wave may be started from this chip or node. The content of the RTC Register 230 may be sent to all ports whose fan-out fences are "off." The Increment Interval Register 234 is cleared and the Update Interval timer is set to the value in Update Interval Register 238. The Start bit may then be cleared.

Upon receiving an external RTC value from a fan-in port, if the corresponding Fan-in fence is "on" or the Update Enable is "off" or the ignore timer is non-zero, the RTC value is ignored and dropped. Otherwise, if the RTC Register 230 is zero, the RTC Register 230 is set to the received RTC value and the increment ratio is not changed. If the RTC Register 230 is greater than zero, the RTC value is not changed and the increment ratio is adjusted appropriately. Afterwards, the content of the RTC Register 230 is sent to each fan-out port whose fence is "off." The Missed Update Register 240 is then cleared. If the Master bit is set, the master elevating counter is set to the value in the Master Start Register 242. The Update Interval timer is set to the value in Update Interval Register 238.

When the update interval timer becomes zero, the missed update register may be incremented and the master elevating counter may be decremented. If the master elevating counter becomes zero, this chip or node assumes the duty of primary master node. Its RTC Register 230 content is sent to all the ports with fan-out fence "off." The update interval timer is then set to the value in the Update Interval Register 238.

An example of an increment ratio (IR) function is as follows:

$$IRnew = \max\left(0, IRcur + \frac{RTCrcv - RTCloc}{2 \times ITVL}\right) \quad (1)$$

In Equation (1), the IRnew is the new increment ratio. IRcur is the current increment ratio. RTCrcv is the received external RTC value. RTCloc is the content of the RTC Register 230. ITVL is the content of the Increment Interval Register 234. Note that the division only needs 20 significant bits to be useful. However, in implementation, the expensive division operation may be approximated using a step function. Also, note that the only case that the RTC clock signal value can jump back in time is when the Clear bit or the RTC Clear bit in the Control Register 244 is written by software. All other changes to the RTC value are either a jump forward in time, or to speed up or slow down the clock via adjusting the increment ratio.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of determining a primary master node in a computer system having a plurality of nodes, the method comprising:

configuring a hierarchy of master nodes from the plurality of nodes;

configuring the master nodes to synchronize the plurality of nodes in the computer system with a clock value, wherein each node is configured with an update interval such that the node resets its update interval when it receives the clock value and sends out its clock value when its update interval has expired;

determining the primary master node from the hierarchy of master nodes; and selecting a backup master node from the hierarchy of master nodes when the plurality of nodes do not receive the clock value after a predetermined period of time has elapsed, the backup master node selected from the hierarchy of master nodes based on its update interval, so that the selected backup master node becomes the primary master node.

2. The method of claim 1, wherein establishing a hierarchy of master nodes comprises configuring the plurality of nodes by a user or by the computer system.

3. The method of claim 1 further comprising:
resetting the primary master node by reconfiguring the hierarchy of master nodes.

4. The method of claim 1 further comprising:
resetting the primary master node by
selecting a node from the plurality of nodes; and
sending out the clock value from the selected node after a predetermined period of time has elapsed in at least a portion of the plurality of nodes.

5. The method of claim 1 further comprising:
resetting the primary master node by
reconfiguring the hierarchy of master nodes;
selecting a node from the reconfigured hierarchy of master nodes; and
sending out the clock value from the selected node after a predetermined period of time has elapsed in at least a portion of the plurality of nodes.

6. The method of claim 1, further comprising adding at least one node to the plurality of nodes, wherein establishing a hierarchy of master nodes from the plurality of nodes includes the plurality of nodes and the at least one node added.

7. A computer program product for determining a primary master node in a computer system having a plurality of nodes, the computer program product comprising a computer non-transitory usable medium having computer readable and executable program code thereon, the computer readable program code comprising:
program code for configuring a hierarchy of master nodes from the plurality of nodes;
program code configuring the master nodes to synchronize the plurality of nodes in the computer system with a clock value, wherein each node is configured with an update interval such that the node resets its update interval when it receives the clock value and sends out its clock value when its update interval has expired;
program code for determining the primary master node from the hierarchy of master nodes; and
program code for selecting a backup master node from the hierarchy of master nodes when the plurality of nodes do not receive the clock value after a predetermined period of time has elapsed, the backup master node selected from the hierarchy of master nodes based on its update interval, so that the selected backup master node becomes the primary master node.

8. The computer program product of claim 7, wherein the computer readable program code for establishing a hierarchy of master nodes further comprises configuring the plurality of nodes by a user or by the computer system.

9. The computer program product of claim 7, wherein the computer readable program code further comprises:
program code for resetting the primary master node by reconfiguring the hierarchy of master nodes.

10. The computer program product of claim 7, wherein the computer readable program code further comprises:
program code for resetting the primary master node by
selecting a node from the plurality of nodes; and
sending out the clock value from the selected node after a predetermined period of time has elapsed in at least a portion of the plurality of nodes.

11. The computer program product of claim 7, wherein the computer readable program code further comprises:
program code for resetting the primary master node by
reconfiguring the hierarchy of master nodes;
selecting a node from the reconfigured hierarchy of master nodes; and
sending out the clock value from the selected node after a predetermined period of time has elapsed in at least a portion of the plurality of nodes.

12. The computer program product of claim 7, wherein the computer readable program code further comprises:
program code for adding at least one node to the plurality of nodes, wherein program code for establishing a hierarchy of master nodes from the plurality of nodes includes the plurality of nodes and the at least one node added.

13. A method of synchronizing a plurality of nodes in a computer system, the method comprising:
determining a primary master node from a hierarchy of master nodes selected from the plurality of nodes, wherein determining the primary master node includes selecting a backup master node from the hierarchy of master nodes after a predetermined period of time has elapsed, so that the selected backup master node becomes the primary master node;
sending a clock value from the primary master node to neighbor nodes of the primary master node;
synchronizing a node RTC value in each neighbor node with the clock value received to derive a synchronized node clock value if a predetermined period of time has elapsed in each neighbor node, if the predetermined period of time has not elapsed, ignoring the clock value received so that the clock value received is not used in synchronizing and is dropped;
distributing the synchronized node clock value from each synchronized node to neighbor nodes of the synchronized node; and
repeating synchronizing and distributing, wherein synchronizing a node clock value includes synchronizing a node RTC value with the synchronized node clock value distributed.

14. The method of claim 13, wherein synchronizing a node RTC value further comprises adjusting a ratio based on a function of a received clock value, the node RTC value and an estimate of the time period since synchronizing last occurred, wherein the received clock value is the clock value or the synchronized node clock value.

15. The method of claim 13 further comprising:
restarting the predetermined period of time in each synchronized node.

16. The method of claim 15, wherein sending a clock value from a master node occurs at a predetermined update interval.

17. The method of claim 13, wherein the backup master node counts a specified number of missed updates before becoming the primary master node.

18. The method of claim 13, wherein the plurality of nodes are configured with a hierarchy of update intervals to provide the hierarchy of master nodes.

19. The method of claim 13, wherein fan-in fences and fan-out fences are implemented for individual ports in the synchronizing step and the distributing step.

20. The method of claim 13, wherein synchronizing a node RTC value includes adjusting the clock value, the synchronized node clock value, or both to compensate for delays.

* * * * *

UNITED STATES PATENT AND TRADEMARK OFFICE
CERTIFICATE OF CORRECTION

Page 1 of 1

PATENT NO. : 8,036,247 B2
APPLICATION NO. : 11/620215
DATED : October 11, 2011
INVENTOR(S) : Paul R. Frank et al.

It is certified that error appears in the above-identified patent and that said Letters Patent is hereby corrected as shown below:

In Col. 13, line 35, replace "code configuring" with "code for configuring".

In Col. 14, line 49, replace "claim 15," with "claim 13,".

Signed and Sealed this
Twenty-third Day of October, 2012

David J. Kappos
*Director of the United States Patent and Trademark Office*